US012755979B2

(12) United States Patent

Visbal Mendoza et al.

(10) Patent No.: US 12,755,979 B2

(45) Date of Patent: Oct. 6, 2026

(54) CONDUCTIVE MATERIAL AND BATTERY

(71) Applicant: TOYOTA JIDOSHA KABUSHIKI KAISHA, Toyota (JP)

(72) Inventors: Heidy Hodex Visbal Mendoza, Nagoya (JP); Masaru Kubota, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 739 days.

(21) Appl. No.: 18/105,039

(22) Filed: Feb. 2, 2023

(65) Prior Publication Data

US 2023/0327126 A1 Oct. 12, 2023

(30) Foreign Application Priority Data

Apr. 7, 2022 (JP) ................................ 2022-063967

(51) Int. Cl.

*H01M 4/62* (2006.01)
*H01M 4/02* (2006.01)
*H01M 10/0562* (2010.01)

(52) U.S. Cl.

CPC ....... *H01M 4/625* (2013.01); *H01M 10/0562* (2013.01); *H01M 2004/021* (2013.01); *H01M 2004/028* (2013.01); *H01M 2300/0068* (2013.01)

(58) Field of Classification Search

CPC ..................................................... H01M 4/624

See application file for complete search history.

(56) References Cited

U.S. PATENT DOCUMENTS

2015/0372345 A1* 12/2015 Kato ................ H01M 10/0562 429/322
2016/0079602 A1* 3/2016 Shindo ................ H01M 4/624 429/245
2021/0202951 A1* 7/2021 Assresahegn Desalegn ................ C01B 25/45
2024/0258497 A1* 8/2024 Yamazaki ............. H01G 11/30

FOREIGN PATENT DOCUMENTS

| | | | |
|---|---|---|---|
| CN | 104885288 | A | 9/2015 |
| CN | 105428656 | A | 3/2016 |
| JP | 2010-135090 | A | 6/2010 |
| JP | 2014-067629 | A | 4/2014 |
| JP | 2021-172544 | A | 11/2021 |
| WO | 2010/064127 | A1 | 6/2010 |
| WO | 2016/084909 | A1 | 6/2016 |

* cited by examiner

*Primary Examiner* — Haroon S. Sheikh

(74) *Attorney, Agent, or Firm* — Dinsmore & Shohl LLP

(57) ABSTRACT

The conductive material is used for the positive electrode of the battery. The conductive material includes a substrate and a film. The film covers at least a portion of the surface of the substrate. The substrate comprises a conductive carbon material. The film includes a glass network forming element and oxygen.

12 Claims, 1 Drawing Sheet

CONDUCTIVE MATERIAL AND BATTERY

CROSS-REFERENCE TO RELATED APPLICATION

This application claims priority to Japanese Patent Application No. 2022-063967 filed on Apr. 7, 2022, incorporated herein by reference in its entirety.

BACKGROUND

1. Technical Field

The present disclosure relates to a conductive material and a battery.

2. Description of Related Art

Japanese Unexamined Patent Application Publication No. 2021-172544 (JP 2021-172544 A) discloses a composite material including a vapor-growth carbon fiber and a metal oxide layer.

SUMMARY

A positive electrode of a battery includes a positive electrode active material. The positive electrode active material tends to have poor electron conductivity. In order to compensate for the electron conductivity of the positive electrode active material, a conductive material is used. Generally, the conductive material includes a conductive carbon material.

For the purpose of increasing the capacity and the output of the battery, the voltage of the battery has been increased. In a battery with the high voltage specification, the positive electrode has a high potential. When the conductive material in the positive electrode is exposed to the high potential, the conductive material can deteriorate. That is, the electron conductivity of the conductive material can decrease. Due to a decrease in the electron conductivity of the conductive material, there is a possibility that the resistance increase rate associated with long-term use of the battery increases.

An object of the present disclosure is to reduce the resistance increase rate.

A technical configuration and effects of the present disclosure will be described below. However, an effect mechanism of the present specification includes speculation. The effect mechanism does not limit the technical scope of the present disclosure.

A conductive material according to a first aspect of the present disclosure is used for a positive electrode of a battery. The conductive material is configured to include: a substrate; and a film, in which the film is configured to cover at least a portion of a surface of the substrate, the substrate is configured to include a conductive carbon material, and the film is configured to include a glass network forming element and oxygen.

According to such a configuration, since the film having a specific composition covers the conductive carbon material, deterioration of the conductive carbon material can be reduced in a high-potential environment. That is, the resistance increase rate associated with long-term use of the battery can be reduced.

The film of the present disclosure includes a glass network forming element (Z) and oxygen (O). In the film, Z and O can form oxide glasses ($ZO_x$) having a network structure. The oxide glasses can have a moderate hardness. Therefore, adhesion between the oxide glasses (film) and the conductive carbon material (substrate) is expected to be improved.

Conventionally, for example, it has been proposed to cover the conductive carbon material with a hard metal oxide such as lithium niobate (see, for example, JP 2021-172544 A). However, there is a possibility that adhesion between the metal oxide and the conductive carbon material decreases since a gap in hardness is large between the metal oxide and the conductive carbon material. In the high-potential environment, it is considered that deterioration of the conductive carbon material is likely to proceed in a portion having low adhesion. That is, there is a possibility that the resistance increase rate cannot be reduced by the hard metal oxide in the high-potential environment.

In the conductive material according to the first aspect, the glass network forming element may include at least one selected from the group consisting of phosphorus, boron, germanium, silicon, and aluminum.

These elements can form the oxide glasses having a network structure.

In the conductive material according to the first aspect, the film may include at least one selected from the group consisting of a phosphate framework and a borate framework.

The film including the phosphate framework and the borate framework can have a moderate hardness.

In the conductive material according to the first aspect, the conductive carbon material may include at least one selected from the group consisting of a vapor-grown carbon fiber, a carbon nanotube, carbon black, a graphene flake, hard carbon, soft carbon, and graphite.

The conductive carbon material may have a fibrous shape or a particulate shape.

In the conductive material according to the first aspect, the film may have a thickness of 1 nm to 20 nm.

When the thickness of the film is equal to or greater than 1 nm, the resistance increase rate is expected to be reduced. When the thickness of the film is equal to or less than nm, the electron conductivity is expected to be improved.

In the conductive material according to the first aspect, the conductive material may have a coverage rate of 20% or more. The coverage rate is measured by X-ray photoelectron spectroscopy (XPS).

When the coverage rate is 20% or more, the resistance increase rate is expected to be reduced.

In the conductive material according to the first aspect, the conductive carbon material may have an R value of, for example, 0.1 to 1.8. The R value indicates a ratio of a D-band to a G-band in a Raman spectrum of the conductive carbon material.

The R value is an indicator of crystallinity. When the conductive carbon material has the R value of 0.1 to 1.8, adhesion to the oxide glasses (film) is expected to be improved.

A battery according to a second aspect of the present disclosure includes a positive electrode. The positive electrode includes a positive electrode active material and the conductive material.

The resistance increase rate associated with long-term use of the battery is expected to be low.

In the battery according to the second aspect, a positive electrode potential when the battery is fully charged may be 4.2 V vs. $Li/Li^+$ to 5.0 V vs. $Li/Li^+$.

The battery may, for example, have a high voltage specification. The conductive material described above is expected to have resistance to the high potential.

In the battery according to the second aspect, the positive electrode may further include a sulfide solid electrolyte.

The battery may be a sulfide-based all-solid-state battery. Although the details of the mechanism are unknown, the presence of the sulfide solid electrolyte in the positive electrode tends to promote deterioration of the conductive carbon material in the high-potential environment. The conductive material described above is expected to be difficult to deteriorate even in the presence of the sulfide solid electrolyte in the positive electrode.

The battery according to the second aspect may further include electrolytic solution.

The battery may be a liquid-based battery. The conductive material described above is expected to be difficult to deteriorate even in the presence of the electrolytic solution in the battery.

Hereinafter, embodiments of the present disclosure (hereinafter can be abbreviated as the "present embodiment") and examples of the present disclosure (hereinafter can be abbreviated as the "present example") will be described. However, the present embodiment and the present example do not limit the technical scope of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Terms and Definitions

Figure 1:
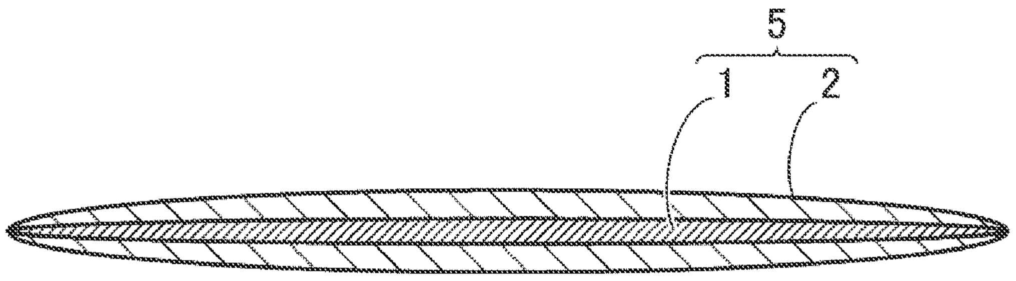
FIG. 1 is a conceptual diagram showing a conductive material according to the present embodiment.

The descriptions of "comprising," "including," "having," and variations thereof are open-ended. The open-ended format may or may not include an additional element in addition to a required element. A statement of "consisting of" is a closed format. However, even when the statement is the closed format, normally associated impurities and additional elements irrelevant to the disclosed technique are not excluded. A statement "substantially consisting of" is a semi-closed format. The semi-closed format allows addition of an element that does not substantially affect the basic and novel characteristics of the disclosed technique.

"At least one of A and B" includes "A or B" and "A and B". "At least one of A and B" may also be referred to as "A and/or B."

Expressions such as "may" and "can" are used in the permissive sense of "having the possibility of" rather than in the obligatory sense of "must".

An element expressed in a singular form also includes plural forms of elements unless otherwise specified. For example, "particle" may mean not only "one particle" but also "an aggregate of particles (powder, powder, particle group)".

For example, a numerical range such as "m % to n %" includes an upper limit value and a lower limit value unless otherwise specified. That is, "m % to n %" indicates a numerical range of "m % or more and n % or less". In addition, "m % or more and n % or less" includes "more than m % and less than n %". Further, a numerical value selected as appropriate from within the numerical range may be used as a new upper limit value or a new lower limit value. For example, a new numerical range may be set by appropriately combining numerical values within the numerical range with numerical values described in other parts of the present specification, tables, drawings, and the like.

All numerical values are modified by the term "approximately." The term "approximately" can mean, for example, ±5%, ±3%, ±1%, and the like. All numerical values can be approximations that may vary depending on the mode of use of the disclosed technique. All numerical values can be displayed with significant digits. A measured value can be an average value of multiple measurements. The number of measurements may be three or more, five or more, or ten or more. In general, it is expected that the reliability of the average value improves as the number of measurements increases. The measured value can be rounded by rounding based on the number of significant digits. The measured value can include errors and the like associated with, for example, the detection limit of a measuring device.

Geometric terms (for example, "parallel", "perpendicular", and "orthogonal") are not to be taken in a strict sense. For example, "parallel" may deviate somewhat from "parallel" in a strict sense. Geometric terms may include, for example, design, work, manufacturing tolerances, errors, etc. Dimensional relationships in each drawing may not match actual dimensional relationships. The dimensional relationships (length, width, thickness, etc.) in each drawing may be changed to facilitate understanding of the disclosed technique. Further, a part of the configuration may be omitted.

When a compound is represented by a stoichiometric compositional formula (e.g., "$LiCoO_2$), the stoichiometric compositional formula is only representative of the compound. The compound may have a non-stoichiometric composition. For example, when lithium cobalt oxide is expressed as "$LiCoO_2$", unless otherwise specified, the lithium cobalt oxide is not limited to a composition ratio of "Li/Co/O=1/1/2", and can include Li, Co and O in any composition ratio. Further, doping with trace elements, substitution, etc. can also be permissible.

"D50" indicates a particle diameter in which the accumulation of the frequency from a side where the particle diameter is small reaches 50% in the volume-based particle diameter distribution. "D50" can be measured by a laser diffraction method.

"Glass network forming element" refers to an element having glass-forming ability. "Glass-forming ability" indicates that an element of interest can form an oxide glass having a network structure by bonding with oxygen.

"V vs. $Li/Li^+$" indicates a potential with the potential at which lithium (Li) undergoes a redox reaction as a reference (zero).

"Full charge" indicates a condition of 100% state of charge (SOC). SOC indicates the percentage of the current charge capacity relative to the full charge capacity of the battery.

The rate of current (time rate) may be represented by the symbol "C". 1C rates allow the rated capacity of the battery to be discharged in one hour.

Coverage Rate/XPS Determination

The coverage rate can be measured by the following procedure. An X-ray photoelectron spectroscope (XPS) device is prepared. A sample (conductive material) is placed in XPS device. The pass energy of 120 eV performs narrow scan analyses. The measurement data is processed by an analysis software. By analyzing the measured values, the element ratio of each element is determined from each peak area of C1s, O1s. From the peak area derived from the glass network forming element (Z), the element ratio of Z is determined. For example, the peak area of a P2p, B1s, Al2p or the like can be measured. The coverage rate is determined by the following formula (1).

$$\theta=(Z+O)/(Z+O+C)\times 100 \quad (1)$$

θ represents the coverage rate (%). Z, O, C represents the element ratio of each element. If the film comprises more than one type of Z, the sum of the respective element ratios is taken as the element ratio of Z. For example, when the film contains three kinds of P, B, and Al, the element ratio of Z is determined by the equation "Z=P+B+Al".

Hereinafter, a XPS device and the like will be described. However, these are merely examples, and equivalent products may be used instead.

XPS equipment: Product name "PHIX-tool", manufactured by ULVAC-FI

Analysis software: MulTiPak, manufactured by ULVAC FI

R Value/Raman Measurement

The R value can be measured in the following procedure. A microscopic Raman spectrometer is provided. The sample (conductive carbon material) is set in a MicroRaman spectrometer. The Raman spectrum of the conductive carbon material is measured. The D-band is the peak appearing in the Raman shift of 1350±20 $cm^{-1}$. The D-band results from structural disturbances. The G-band is the peak appearing in the Raman shift of 1590±20 $cm^{-1}$. The G-band is derived from the graphite structure (six-membered ring). The R value is obtained by the following formula (2).

$$R=I_D/I_G \quad (2)$$

R represents an R value. $I_D$ indicates the D-band strength (peak area). $I_G$ indicates the strength of the G-band.

The Raman measurement conditions are shown below. However, the apparatus is merely an example, and may be substituted by an equivalent. In addition, the appropriate conditions may differ depending on the device.

Microscopic Raman Spectrometer: "DXR3xi Imaging MicroRaman", manufactured by Thermo Fisher Scientific Laser energy: 1.5 mW Exposure time: 50 Hz Scan count: 50

Film Thickness Measurement

The thickness of the film can be measured by the following procedure. A sample is prepared by embedding a conductive material in a resin material. The sample is subjected to a cross-sectional process by an ion milling device. For example, a product name "Arblade (registered trademark) 5000" (or equivalent) manufactured by Hitachi High-Technologies, Inc. may be used. The cross-section of the sample is observed by Scanning Electron Microscope (SEM). For example, Hitachi High-Technologies, Inc.'s brand name "SU8030" (or equivalent) may be used. For each of the ten conductive materials, the thickness of the film is measured in 20 fields of view. An arithmetic mean of a total of 200 thicknesses is taken as the thickness of the film.

Conductive Material

FIG. 1 is a conceptual diagram illustrating a conductive material according to the present embodiment. The conductive material 5 is used as a positive electrode of a battery. The conductive material 5 may be used as a negative electrode of a battery. The battery and the electrode will be described later. The conductive material 5 includes a substrate 1 and a film 2.

Substrate

The substrate 1 may have any shape. The substrate 1 may be, for example, fibrous or particulate. The substrate 1 may have any size. When the substrate 1 is fibrous, the fiber diameter may be, for example, 5 nm to 500 nm. The fiber length may be, for example, 100 times or more of the diameter. When the substrate 1 is particulate, the largest ferret diameter may be, for example, 1 nm to 1000 nm.

The substrate 1 has electronic conductivity. The substrate 1 comprises a conductive carbon material. The conductive carbon material may include, for example, at least one selected from the group consisting of VGCF, CNT, CB, GF, hard carbon, soft carbon, and graphite. CB may include, for example, at least one selected from the group consisting of acetylene black (AB), Ketjen black (registered trademark), furnace black, channel black, and thermal black.

The conductive carbon material may have an R value of, for example, 0.1 to 1.8. When the conductive carbon material has an R value of 0.1 to 1.8, adhesion to the oxide glass is expected to be improved. The conductive carbon material may have, for example, an R value of 0.1 to 1 or an R value of 0.1 to 0.5.

Film

The film 2 covers at least a part of the surface of the substrate 1. The film 2 may protect the conductive carbon material. The coverage rate may be, for example, 20% or more. The higher the coverage rate, the lower the resistance increase rate is expected. The coverage rate, for example, may be 40% or more, may be 60% or more, may be 80% or more, it may be 100%.

The film 2 may have a thickness of, for example, 1 nm to 20 nm. When the thickness of the film is equal to or greater than 1 nm, the resistance increase rate is expected to be reduced. When the thickness of the film is equal to or less than 20 nm, the electron conductivity is expected to be improved. The thickness of the coating film may be, for example, 5 nm or more, 10 nm or more, or 15 nm or more. The thickness of the coating film may be, for example, less than or equal to 15 nm, less than or equal to 10 nm, or less than or equal to 5 nm.

The film 2 includes a glass network forming element and oxygen. The glass network forming element and the oxygen may form an oxide glass. The glass network forming element may include, for example, at least one selected from the group consisting of P, B, Ge, Si, and Al.

The film 2 may further comprise, for example, Li. The film 2 may have, for example, a composition represented by the following formula (3).

$$Li_yZO_x \quad (3)$$

Z represents a glass network forming element. Z may include, for example, at least one selected from the group consisting of P, B, and Al. x and y are arbitrary numbers. x and y can be specified, for example, from the elemental ratios of XPS. y may be, for example, 3 or less, 2.5 or less, 1 or less, 0.5 or less, or 0. The smaller y, the softer the film 2 tends.

The film 2 may include, for example, at least one selected from the group consisting of a phosphate framework and a borate framework. The film 2 containing the phosphate framework and the borate framework may have a suitable hardness. For example, in Time-of-Flight Secondary Ion Mass Spectrometry (TOF-SIMS) of the conductive material 5, when a fragment such as $PO_2^-$, $PO_3^-$ is detected, the film 2 is considered to comprise a phosphate framework. For example, in TOF-SIMS of the conductive material 5, when a fragment such as $BO_2^-$, $BO_3^-$ is detected, the film 2 is considered to include a borate framework.

The film can be formed in any manner. For example, the coating film 2 may be formed by a barrel sputtering method. The composition of the film 2 can be adjusted by, for example, the composition of the sputtering target. The sputtering target may include, for example, at least one selected from the group consisting of $Li_3PO_4$, $Al_2O_3$, and $BPO_4$. The thickness of the film 2 can be adjusted, for example, by the sputtering time.

Battery

Figure 2:
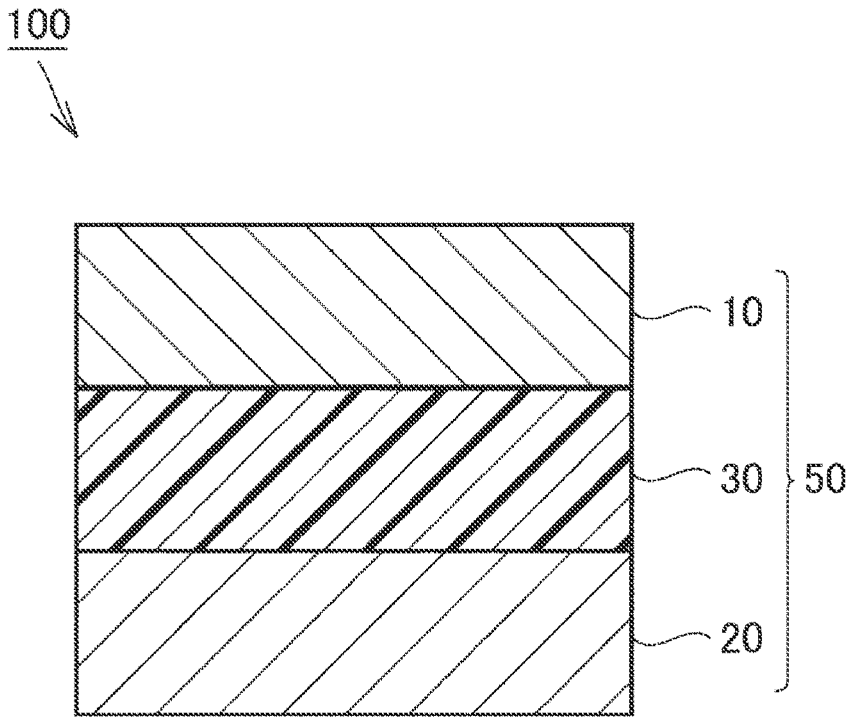
FIG. 2 is a conceptual diagram illustrating a battery according to the present embodiment.

FIG. 2 is a conceptual diagram illustrating a battery according to the present embodiment. The battery 100 includes a power generation element 50. The battery 100 may include an exterior body (not shown). The exterior body may house the power generation element 50. The sheath may have any form. The exterior body may be, for example, a pouch made of a metal foil laminate film, a case made of metal, or the like. The power generation element 50 includes a positive electrode 10, a separator 30, and a negative electrode 20. That is, the battery 100 includes the positive electrode 10.

Positive Electrode Potential

The battery 100 may have a high voltage specification, for example. For example, the positive electrode potential at full charge may be 4.2 V vs. $Li/Li^+$ to 5.0V vs. $Li/Li^+$. When the positive electrode potential is greater than or equal to 4.2 V vs. $Li/Li^+$, degradation of the conductive carbon material tends to proceed. The conductive material according to the present embodiment is expected to be difficult to deteriorate even in a high-potential environment of 4.2 V vs. $Li/Li^+$ or more. The positive electrode potential at the time of full charge may be, for example, 4.3 V vs. $Li/Li^+$ or more, 4.4 V vs. $Li/Li^+$ or more, or 4.5 V vs. $Li/Li^+$ or more. The positive electrode potential at the time of full charge may be, for example, 4.9 V vs. $Li/Li^+$ or less, 4.8 V vs. $Li/Li^+$ or less, or 4.7 V vs. $Li/Li^+$ or less.

Electrolytic Solution

The battery 100 may be, for example, a liquid-based battery. "Liquid-based battery" refers to a battery including an electrolytic solution. That is, the battery 100 may include an electrolytic solution (liquid electrolyte). The conductive material in the present embodiment is expected to be difficult to deteriorate even in the presence of an electrolytic solution. The electrolytic solution may have any composition. The electrolytic solution may include, for example, a carbonate-based solvent and a Li salt. The carbonate-based solvents may include, for example, ethylene carbonate (EC), dimethyl carbonate (DMC), ethyl methyl carbonate (EMC), and the like. Li salt may include, for example, $LiPF_6$. The electrolytic solution may further contain an optional additive.

All-Solid-State Battery

The battery 100 may be, for example, an all-solid-state battery. The all-solid-state battery includes a solid electrolyte. The all-solid-state battery may include, for example, a sulfide solid electrolyte. Although the details of the mechanism are unknown, the presence of the sulfide solid electrolyte in the positive electrode tends to promote deterioration of the conductive carbon material in the high-potential environment. The conductive material of the present embodiment is expected to be difficult to deteriorate even in the presence of a sulfide solid electrolyte. Hereinafter, the configuration of the all-solid-state battery will be mainly described. The configuration of the liquid-based battery is also described as appropriate.

Positive Electrode

The positive electrode 10 is layered. The positive electrode 10 may include, for example, a positive electrode active material layer and a positive electrode current collector. For example, the positive electrode active material layer may be formed by coating of a positive electrode composite material on the surface of the positive electrode current collector. The positive electrode current collector may include, for example, an Al foil. The positive electrode current collector may have a thickness of, for example, 5 μm to 50 μm.

The positive electrode active material layer may have a thickness of, for example, 10 μm to 200 μm. The positive electrode active material layer includes a positive electrode active material and a conductive material. The positive electrode active material layer may further include a sulfide solid electrolyte and a binder. For example, the positive electrode active material layer in the liquid-based battery may not include the sulfide solid electrolyte.

The positive electrode active material may be in a particulate form, for example. The positive electrode active material may have a D50 of, for example, 1 μm to 30 μm. The positive electrode active material may have any composition. The positive electrode active material may include, for example, at least one selected from the group consisting of $LiCoO_2$, $LiNiO_2$, $LiMnO_2$, $LiMn_2O_4$, $Li(NiCoMn)O_2$, $Li(NiCoAl)O_2$, and $LiFePO_4$. For example, "(NiCoMn)" in "$Li(NiCoMn)O_2$" indicates that the sum of the compositional ratios in parentheses is 1. As long as the sum is 1, the amounts of the individual components are optional. $Li(NiCoMn)O_2$ may include, for example, $LiNi_{1/3}Co_{1/3}Mn_{1/3}O_2$, $LiNi_{0.5}Co_{0.2}Mn_{0.3}O_2$, $LiNi_{0.8}Co_{0.1}Mn_{0.1})_2$. $Li(NiCoAl)O_2$ may include, for example, $LiNi_{0.8}Co_{0.15}Al_{0.05}O_2$.

The positive electrode active material may be coated with, for example, a buffer layer. The buffer layers may have a thickness of, for example, 5 nm to 50 nm. The buffer layers may include, for example, $LiNbO_3$, $Li_3PO_4$.

The details of the conductive material are as described above. The blending amount of the conductive material may be, for example, 0.1 to 10 parts by mass with respect to 100 parts by mass of the positive electrode active material.

The sulfide solid electrolyte can form an ion conduction path in the positive electrode active material layer. The blending amount of the sulfide solid electrolyte may be, for example, 1 to 200 parts by volume, 50 to 150 parts by volume, or 50 to 100 parts by volume with respect to 100 parts by volume of the positive electrode active material. The sulfide solid electrolyte includes sulfur (S). The sulfide solid electrolyte may include, for example, Li, P, and S. The sulfide solid electrolyte may further include, for example, O, Si, and the like. The sulfide solid electrolyte may further contain, for example, a halogen. The sulfide solid electrolyte may further contain, for example, iodine (I), bromine (Br), and the like. The sulfide solid electrolyte may be, for example, a glass-ceramic type or an argyrodite type. The sulfide solid electrolyte may contain at least one selected from the group consisting of, for example, $LiI—LiBr—Li_3PS_4$, $Li_2S—SiS_2$, $LiI—Li_2S—SiS_2$, $LiI—Li_2S—P_2S_5$, $LiI—Li_2O—Li_2S—P_2S_5$, $LiI—Li_2S—P_2O_5$, $LiI—Li_3PO_4—P_2S_5$, $Li_2S—P_2S_5$, and $Li_3PS_4$.

For example, "$LiI—LiBr—Li_3PS_4$" refers to a sulfide solid electrolyte produced by mixing LiI and LiBr with $Li_3PS_4$ in any molar ratio. For example, a sulfide solid electrolyte may be produced by a mechanochemical process. "$Li_2S—P_2S_5$" includes $Li_3PS_4$. $Li_3PS_4$ may be generated, for example, by mixing $Li_2S$ and $P_2S_5$ with "$Li_2S/P_2S_5$=75/25 (molar ratio)".

The binder may bond the solid materials together. The blending amount of the binder may be, for example, 0.1 to 10 parts by mass with respect to 100 parts by mass of the positive electrode active material. The binder can contain any component. The binder may include, for example, at least one selected from the group consisting of polyvinylidene fluoride (PVdF), vinylidene fluoride-hexafluoropropylene copolymer (PVdF-HFP), styrene-butadiene rubber (SBR), butadiene rubber (BR), and polytetrafluoroethylene (PTFE).

Negative Electrode

The negative electrode 20 is layered. The negative electrode 20 may include, for example, a negative electrode active material layer and a negative electrode current collector. For example, the negative electrode active material layer may be formed by coating of a negative electrode composite material on the surface of the negative electrode current collector. The negative electrode current collector may include, for example, a copper (Cu) foil, a nickel (Ni) foil, or the like. The negative electrode current collector may have a thickness of, for example, 5 μm to 50 μm.

The negative electrode active material layer may have a thickness of, for example, 10 μm to 200 μm. The negative electrode active material layer includes a negative electrode active material. The negative electrode active material layer may further include a conductive material, a binder, and a sulfide solid electrolyte. The negative electrode active material may include an optional component. The negative electrode active material may include, for example, at least one selected from the group consisting of graphite, Si, $SiO_x$ ($0<x<2$), and $Li_4Ti_5O_{12}$.

For example, the negative electrode active material layer in the liquid-based battery may not include the sulfide solid electrolyte. Between the negative electrode 20 and the positive electrode 10, the sulfide solid electrolyte may be of the same type or may be of different types. Between the negative electrode 20 and the positive electrode 10, the conductive material may be of the same type or different types.

Separator

The separator 30 is interposed between the positive electrode 10 and the negative electrode 20. The separator 30 separates the positive electrode 10 from the negative electrode 20. The separator 30 includes a sulfide solid electrolyte. The separator 30 may further include a binder. The separator 30 in the all-solid-state battery may also be referred to as a "solid electrolyte layer", for example. Between the separator 30 and the positive electrode 10, the sulfide solid electrolyte may be of the same type or may be of different types. Between the separator 30 and the negative electrode 20, the sulfide solid electrolyte may be of the same type or different types.

The separator 30 in the liquid-based battery may include, for example, a porous film made of polyolefin.

EXAMPLES

Preparation of Conductive Material

The conductive material according to No. 1 to No. 3 was prepared as follows. Hereinafter, a conductive material or the like according to "No. 1" may be abbreviated as "No. 1".

No. 1

As a conductive carbon material, "VGCF-H" manufactured by Showa Denko Co., Ltd. was prepared. The conductive carbon material is fibrous. The conductive carbon material comprises VGCF. In No. 1, the conductive carbonaceous material was a conductive material.

No. 2

A powder barrel sputtering apparatus was prepared. A 10 g of conductive carbonaceous material (the "VGCF-H") was placed in the reactor vessel. A conductive material was produced by performing a sputtering process while the workpiece was agitated in the reaction vessel. The conditions of the sputtering treatment were as follows.

Sputtering target: $Li_3PO_4$ (manufactured by Toshima Corporation)

Sputter power supply: RF power supply, power 100 W

Sputtering time: 90 h

The conductive material of No. 2 is believed to include a substrate and a film. The substrate is believed to comprise VGCF. The film is considered to include $Li_yPO_x$, where x, y are any number.

No. 3

Conductive materials were produced as in No. 2 except that the sputtering times were changed to 180 h.

Evaluation

An evaluation cell (all-solid-state battery) was manufactured by the following procedure.

Preparation of Positive Electrode

The following materials were prepared.

Positive electrode active material/buffer layer: $LiNi_{1/3}Co_{1/3}Mn_{1/3}O_2$ phosphate compound Sulfide solid electrolyte: $LiI—Li_2S—P_2S_5$ (glass-ceramic type, D50=0.8 μm)

Conductive material: Any one of the conductive materials of the above No. 1 to No. 3.

Binder: BR

Dispersion medium: Heptane

Positive electrode current collector: Al foil

A slurry was prepared by mixing a positive electrode active material, a sulfide solid electrolyte, a conductive material, a binder, and a dispersion medium. The mixing ratio of the positive electrode active material and the sulfide solid electrolyte was "positive electrode active material/sulfide solid electrolyte=7/3 (volume ratio)". The blending amount of the conductive material was 3 parts by mass with respect to 100 parts by mass of the positive electrode active material. The blending amount of the binder was 0.7 parts by mass with respect to 100 parts by mass of the positive electrode active material. The slurry was thoroughly agitated by an ultrasonic homogenizer (product name: "UH-50", manufactured by SMT). A coating film was formed by coating the slurry on the surface of the positive electrode current collector. The paint film was dried at 100° C. for 30 minutes by a hot plate. As a result, the positive electrode raw material was produced. A disk-shaped positive electrode was cut out from the positive electrode raw material. The area of the positive electrode was 1 $cm^2$.

Preparation of the Negative Electrode

The following materials were prepared.

Negative active material: $Li_4Ti_5O_{12}$ (D50=1 μm)

Sulfide solid electrolyte: $LiI—Li_2S—P_2S_5$ (glass-ceramic type, D50=0.8 μm)

Conductive material: VGCF

Binder: BR

Dispersion medium: Heptane

Negative electrode current collector: Cu foil

A slurry was prepared by mixing a sulfide solid electrolyte, a conductive material, a binder, and a dispersing medium by an agitator [Filmix (registered trademark), Form "30-L Type", manufactured by Primix Corporation]. The agitation rate (rotational speed) was 2000 rpm and the agitation time was 30 minutes. After 30 minutes of stirring, the negative electrode active material was added to the slurry, and the slurry was further stirred. The agitation rate was 15000 rpm and the agitation time was 60 minutes.

The mixing ratio of the negative electrode active material and the sulfide solid electrolyte was "negative electrode active material/sulfide solid electrolyte=6/4 (volume ratio)". The blending amount of the conductive material was 1 part by mass with respect to 100 parts by mass of the negative electrode active material. The blending amount of the binder was 2 parts by mass with respect to 100 parts by mass of the negative electrode active material.

A coating film was formed by coating the slurry on the surface of the negative electrode current collector. The paint film was dried at 100° C. for 30 minutes by a hot plate. As a result, the negative electrode raw material was produced. A disk-shaped negative electrode was cut out from the negative electrode raw material. The area of the negative electrode was 1 $cm^2$.

Preparation of Separators

The following materials were prepared.

Sulfide solid electrolyte: LiI—$Li_2S$—$P_2S_5$ (glass-ceramic type, D50=2.5 μm)

A cylindrical jig made of ceramic was prepared. The area of the hollow-section (section perpendicular to the axial direction) was 1 $cm^2$. A powder of a sulfide solid electrolyte was filled in the cylindrical jig. The powder was smoothly leveled. A separator (solid electrolyte layer) was formed by pressing the sulfide solid electrolyte in the cylindrical jig. The pressing force was 1 ton/$cm^2$.

Assembly

In the cylindrical jig, the positive electrode, the separator, and the negative electrode were laminated to form a laminated body. The separator was disposed between the positive electrode and the negative electrode. The laminated body was subjected to press working to form a power generation element. The pressing force was 6 tons/$cm^2$. Two stainless steel rods were inserted into the cylindrical jig to sandwich the power generation element. The stainless-steel rod was constrained so that a load of 1 ton was applied to the power generation element. The stainless steel bar may have a terminal function. As described above, the evaluation cell was manufactured.

Measurement of Resistance Increase Rate

The initial capacity of the evaluation cell was confirmed. Charge and discharge conditions are as follows.

Charge: Constant current-Constant voltage, Rate=1/3C

Discharge: Constant current system, Rate=1/3C

After checking the initial capacitance, SOC of the evaluated cell was adjusted to 40%. Depending on 2C rate, the evaluation cell was discharged for 5 seconds. The initial resistance was obtained from the voltage drop after 5 seconds.

After measuring the initial resistance, the evaluation cells were stored in a thermostat at 60° C. for 14 days. During storage, the evaluation cell was trickle charged so that the positive electrode potential remained at 4.5 V vs. $Li/Li^+$. After 14 days, the resistance after durability was measured under the same conditions as the initial resistance. The resistance increase rate was obtained by dividing the resistance after durability by the initial resistance. The resistance increase rate is expressed as a percentage. The resistance increase rate is shown in Table 1 below.

TABLE 1

| | Conductive material | | | All-solid-state battery |
|---|---|---|---|---|
| No. | Substrate | Film | Sputtering time | Resistance increase rate |
| 1 | VGCF | | | 25% |
| 2 | VGCF | $Li_yP0_x$ | 90 h | 9% |
| 3 | VGCF | $Li_yP0_x$ | 180 h | 4% |

Results

In No. 2, 3, the resistance increase rate was reduced compared to No. 1. The conductive material of No. 1 does not include a film. The conductive material of No. 2, 3 includes a film. The film comprises a glass network forming element (P) and oxygen.

No. 3 had a lower resistance increase rate than No. 2. It is believed that No. 3 has a higher coverage rate than No. 2.

The present embodiment and the present example are illustrative in all respects. The present embodiment and the present example are not restrictive. The technical scope of the present disclosure includes all changes within the meaning and range equivalent to the description of the claims. For example, from the beginning, it is planned to extract an appropriate configuration from the present embodiment and the present example and combine them as appropriate.

What is claimed is:

1. A conductive material used for a positive electrode of a battery, the conductive material comprising:
- a substrate; and
- a film, wherein:
- the film is configured to cover at least a portion of a surface of the substrate;
- the substrate is configured to include a conductive carbon material;
- the film is configured to include a glass network forming element and oxygen; and
- the film consists of lithium atoms, phosphorous atoms, and oxygen atoms.

2. The conductive material according to claim 1, wherein the glass network forming element is phosphorus.

3. The conductive material according to claim 1, wherein the film includes a phosphate framework.

4. The conductive material according to claim 1, wherein the conductive carbon material includes at least one selected from the group consisting of a vapor-grown carbon fiber, a carbon nanotube, carbon black, a graphene flake, hard carbon, soft carbon, and graphite.

5. The conductive material according to claim 1, wherein the film has a thickness of 5 nm to 20 nm.

6. The conductive material according to claim 1, wherein:
- the conductive material has a coverage rate of 20% or more; and
- the coverage rate is measured by X-ray photoelectron spectroscopy.

7. The conductive material according to claim 1, wherein:
- the conductive carbon material has an R value of 0.1 to 1.8; and
- the R value indicates a ratio of a D-band to a G-band in a Raman spectrum of the conductive carbon material.

8. The conductive material of claim 1, wherein the film comprises a glass network formed from the glass network forming element and oxygen.

9. A battery comprising a positive electrode, wherein the positive electrode includes a positive electrode active material and the conductive material according to claim 1.

10. The battery according to claim 9, wherein a positive electrode potential when the battery is fully charged is 4.2 Vvs.Li/$Li^+$ to 5.0 Vvs.Li/$Li^+$.

11. The battery according to claim 9, wherein the positive electrode further includes a sulfide solid electrolyte.

12. The battery according to claim 9, further comprising electrolytic solution.

* * * * *